(12) United States Patent
Young et al.

(10) Patent No.: US 8,112,464 B2
(45) Date of Patent: Feb. 7, 2012

(54) ON-DEMAND ACCESS TO CONTAINER FILE DIRECTORIES

(75) Inventors: Blaine R. Young, Redmond, WA (US); Bruce L. Green, Seattle, WA (US); Raja S. Ganjikunta, Redmond, WA (US); Minxiao Zhou, Bellevue, WA (US); Brett A. Muzzey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 12/342,680

(22) Filed: Dec. 23, 2008

(65) Prior Publication Data

US 2009/0271451 A1 Oct. 29, 2009

Related U.S. Application Data

(63) Continuation-in-part of application No. 12/111,185, filed on Apr. 28, 2008.

(51) Int. Cl.
*G06F 17/30* (2006.01)

(52) U.S. Cl. ........ 707/822; 707/828; 707/705; 707/609; 707/674

(58) Field of Classification Search .................. 707/609, 707/674, 705, 822, 828
See application file for complete search history.

(56) References Cited

U.S. PATENT DOCUMENTS

| | | | |
|---|---|---|---|
| 5,991,753 A | 11/1999 | Wilde | |
| 6,125,373 A | 9/2000 | Momoh et al. | |
| 6,269,382 B1 | 7/2001 | Cabrera et al. | |
| 6,341,341 B1 | 1/2002 | Grummon | |
| 6,857,001 B2 | 2/2005 | Hitz | |
| 7,085,785 B2 | 8/2006 | Sawdon | |
| 7,155,710 B2 | 12/2006 | Breckner | |
| 7,234,077 B2 | 6/2007 | Curran et al. | |
| 7,257,652 B2 | 8/2007 | Gilliam et al. | |
| 7,546,431 B2 * | 6/2009 | Stacey et al. .................. | 711/165 |
| 2003/0177107 A1 | 9/2003 | Brown et al. | |
| 2003/0187822 A1 | 10/2003 | Lefurgy | |
| 2005/0010747 A1 | 1/2005 | Gilliam et al. | |
| 2005/0033932 A1 | 2/2005 | Pudipeddi et al. | |
| 2006/0179261 A1 | 8/2006 | Rajan | |
| 2006/0212481 A1 * | 9/2006 | Stacey et al. ............... | 707/104.1 |
| 2006/0224636 A1 | 10/2006 | Kathuria | |
| 2007/0016631 A1 | 1/2007 | Robert et al. | |
| 2007/0078801 A1 | 4/2007 | Guruprakash | |
| 2008/0010284 A1 | 1/2008 | Beck | |
| 2009/0063556 A1 | 3/2009 | Nemoto et al. | |
| 2009/0150533 A1 * | 6/2009 | McClanahan et al. ........ | 709/223 |
| 2009/0271442 A1 | 10/2009 | Yong | |

OTHER PUBLICATIONS

"Final Office Action", U.S. Appl. No. 12/111,185, filed Jan. 6, 2011,23 pages.
"Non-Final Office Action", U.S. Appl. No. 12/111,185, filed Mar. 28, 2011,26 pages.

(Continued)

*Primary Examiner* — Cheryl Lewis

(57) ABSTRACT

One or more levels of a stub directory from a container file are written out to a storage device. The stub directory initially includes identifiers of one or more directories in the one or more levels of the stub directory but not identifiers of additional directories in the one or more directories. In response to a request to access one of the one or more directories, identifiers of one or more additional directories and/or one or more files in the one directory are extracted from the container file.

20 Claims, 9 Drawing Sheets

OTHER PUBLICATIONS

"Snapshot Volumes", Retrieved from http://www.centos.org/docs/5/html/Cluster_Logical_Volume_Manager/snapshot_volumes.html on Jan. 18, 2008.,2 Pages.

"XIV—NextraTM Snapshot Implementation", Retrieved from http://www.xivstorage.com/materials/white_papers/nextra_snapshot_white_paper.pdf,(Sep. 2007),19 Pages.

"What is WinImage?", Retrieved from http://www.winimage.com/winimage.htm on Jan. 18, 2008., 3 Pages.

"TreeView Populate on Demand", retrieved at <<http://www.devdirect.com/ALL/eowebtreeview_SOLN_00010072.aspx>> Sep. 30, 2008, 1 Page.

"AJAX Load-On-Demand Directory", retrieved at <<http://demos.mcmscontrols.com/ASPNET/Treeview/Examples/Programming/ClientLoadOnDemandDirectory/DefaultVB.aspx>> Sep. 30, 2008, 1 Page.

Kirkham, Chris, "Distributed File Systems", retrieved at <<http://www.cs.man.ac.uk/~chris/cs3052/ch9.pdf>> Mar. 7, 2007, pp. 1-4.

"Differences between Autodir and Autofs", retrieved at <<http://tldp.org/HOWTO/Autodir-HOWTO/x130.html>> Sep. 30, 2008, 1 Page.

"Understanding the Automounter Implementation", retrieved at <<http://www.nersc.gov/vendor_docs/ibm/pssp/admin/am0a0mst79.html>> Sep. 30, 2008, 6 Pages.

"Non-Final Office Action", U.S. Appl. No. 12/111,185, filed Oct. 7, 2010,22 pages.

* cited by examiner

ON-DEMAND ACCESS TO CONTAINER FILE DIRECTORIES

RELATED APPLICATIONS

This application is a continuation-in-part of U.S. patent application Ser. No. 12/111,185, filed Apr. 28, 2008, which is hereby incorporated by reference herein.

BACKGROUND

Container files typically include multiple different files and directories. These files can be computer programs or other digital content, and can number into the hundreds, thousands, or more. Although grouping together multiple files and directories into a single container file can make it easier to distribute those files and directories, there are problems with these container files. One problem with container files is the manner in which changes can be made to files in the container file. Typically in order to make such changes, all of the files are copied from the container file onto a disk, the desired changes are made to some of the files, and then all of the files are stored back into the container file. This is problematic because, as the number of files in the container file can be very large, a significant amount of time can be spent on this process of copying to disk and storing back to the container file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more levels of a stub directory from a container file are written out to a storage device. The stub directory initially includes identifiers of one or more directories in the one or more levels of the stub directory but not identifiers of additional directories in the one or more directories. In response to a request to access one of the one or more directories, identifiers of at least one or more additional directories and one or more files in the one directory are written out from the container file.

In accordance with one or more aspects, a status value is received from a file system, the status value indicating that a request to access a directory failed because an access control tag associated with the directory was set. A request is sent to a container modification module to have the directory extracted from the container file and written out to a storage device. After the directory is extracted from the container file and written out to the storage device, the access control tag associated with the directory is cleared and the request to the file system is reissued.

BRIEF DESCRIPTION OF THE DRAWINGS

The same numbers are used throughout the drawings to reference like features.

DETAILED DESCRIPTION

On-demand access to container file directories is discussed herein. Generally, in order to make changes to one or more files in a container file, a portion of a stub directory for the files and directories in the container file is written out to a storage device (such as a disk). This stub directory includes the names of at least some of the files and directories in the container file as well as the directory structure of those files and directories. The stub directory need not, however, include the actual data for each file. The stub directory is written out to the storage device one or more levels at a time on-demand rather than being written out in its entirety ahead of time. Accordingly, no time need be spent writing out directories to the storage device that will not be accessed.

When a request to access a directory in the stub directory is received, a temporary directory that includes names of the files and the directories in the requested directory is written out to the storage device. This temporary directory is then atomically swapped with the requested directory. When a request to access a file is received, the data for that file is retrieved from the container file and written out to the storage device. Any desired modifications to that file can be made, and then all of the modified files are stored back into the container file. Accordingly, no time need be spent writing out files to the storage device from the container file, and then writing those files back into the container file, if no changes are made to those files.

Figure 1:
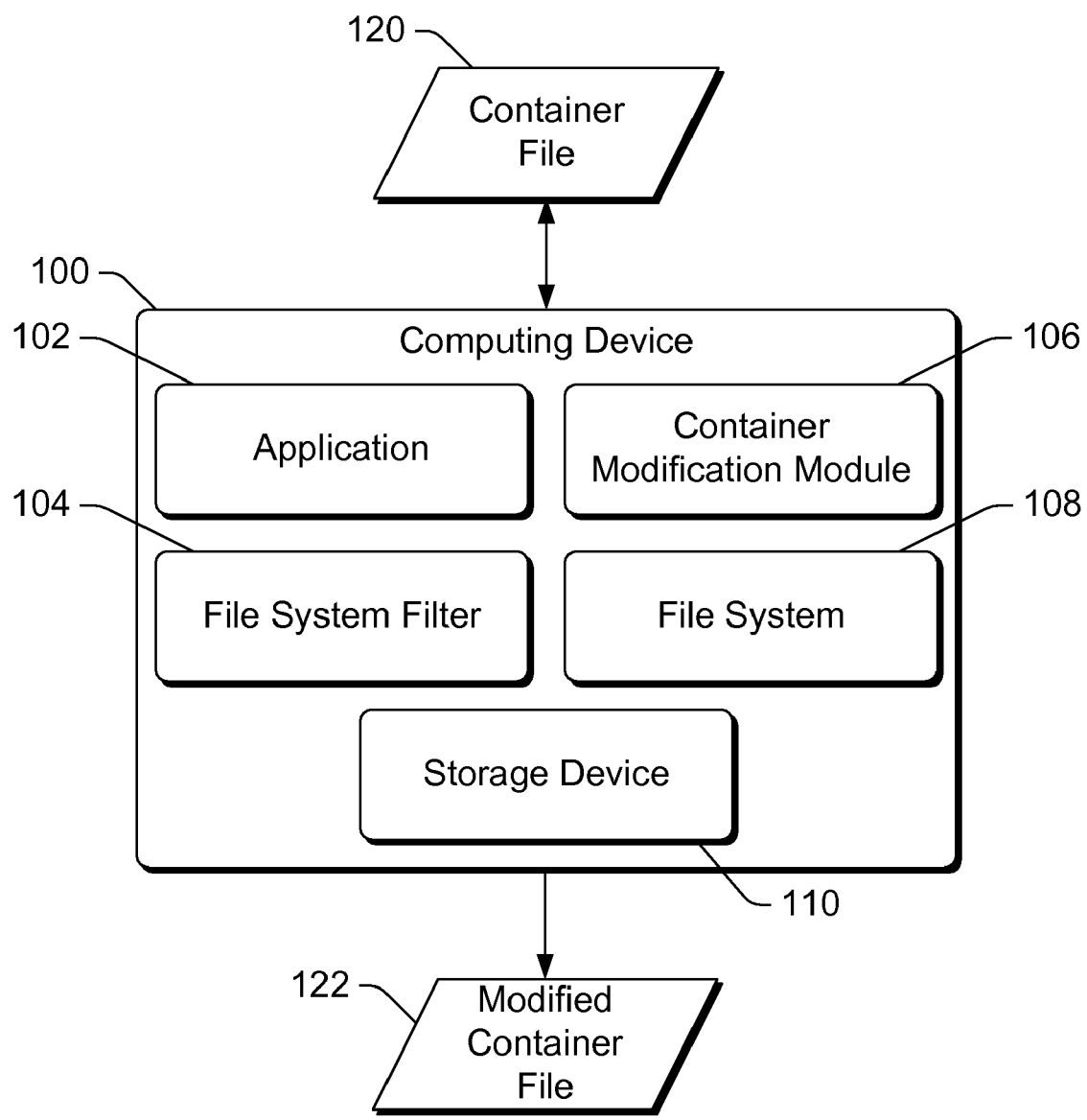
FIG. 1 is a block diagram illustrating an example computing device implementing the on-demand access to container file directories in accordance with one or more embodiments.

FIG. 1 is a block diagram illustrating an example computing device 100 implementing the on-demand access to container file directories in accordance with one or more embodiments. Computing device 100 can be a variety of different devices capable of accessing container files. For example, computing device 100 can be a desktop computer, a mobile station, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, handheld game consoles).

Computing device 100 includes an application 102, a file system filter 104, a container modification module 106, a file system 108, and a storage device 110. Although illustrated in FIG. 1 as being part of a same computing device 100, one or more of application 102, file system filter 104, container modification module 106, file system 108, and storage device 110 can be implemented on different devices. For example, application 102 could be implemented on a separate device, storage device 110 could be a separate device external to computing device 100, and so forth.

A container file 120 is accessed by computing device 100, one or more files in container file 120 are modified, and computing device 100 generates a modified container file 122. Application 102 requests changes or modifications to be made to files in container file 120. Container modification module 106 provides a toolset for extracting individual files from container file 120 and restoring files to container file 120. File system 108 manages creation of, reading from, and writing to files and directories on storage device 110. File system filter 104 assists in modifying individual files of container file 120, as discussed in more detail below.

Storage device 110 can be a variety of different storage devices, such as magnetic or optical discs, Flash memory, removable or fixed memory, and so forth. Although storage device 110 is illustrated as being part of computing device 100, alternatively storage device 110 can be a remote storage device coupled to computing device 100, such as via a local area network (LAN), the Internet, a local connection (e.g., a Universal Serial Bus (USB) connection), and so forth.

Container file 120 includes multiple files and one or more directories (also referred to as folders), typically in a compressed form. These files and directories can be compressed using a variety of different (typically lossless) compression techniques. Container file 120 also records the directory structure for these files and directories. The directory structure refers to which files are included in which directories, and which directories are included in which other directories. A variety of different types of files can be included in container file 120, such as computer program files, libraries, data files, text files, image files, audio (e.g., song) files, video files, and so forth. The particular files included in a particular container file 120 can vary and are based on the desires of the creator of container file 120. The number of files and directories in container file 120 can vary, and oftentimes can be very large, such as ranging into the thousands, tens of thousands, or even more files.

Container file 120 can be implemented in accordance with a variety of different formats or protocols. For example, container file 120 can be a Windows Imaging Format (WIM) file, Cabinet (CAB) file, a ZIP file, and so forth. Container file 120 is accessed by computing device 100, and in one or more embodiments is stored in memory or a storage device (e.g., device 110) of computing device 100.

Reference is made herein to writing out a file or directory of container file 120. Writing out a directory from container file 120 refers to creating a directory on storage device 110 (or alternatively another memory or storage device) allowing file system 108 to access that directory. This accessing of the directory can include, for example, retrieving identifiers of files and/or other directories in the directory, adding or deleting identifiers of files and/or other directories to or from the directory, modifying identifiers of files and/or other directories in the directory, and so forth. Writing out a directory from container file 120 includes populating that directory with identifiers of the files and/or other directories within that directory, but not the data within those files and not identifiers of the additional files and/or additional directories within those other directories. File system 108 is able to access a directory that is written out and identify the files and/or other directories within that written out directory, but is not able to access the data in the files (until the files are written out) or directories within the other directories (until those directories are written out).

Similarly, writing out a file from container file 120 refers to creating a file on storage device 110 (or alternatively another memory or storage device) having the same data as the file in container file 120, allowing file system 108 to access the file. This writing out of a directory and/or file typically includes decompressing the data being written out. Typically, file system 108 is not able to access (e.g., read from and/or write to) individual files and directories in container file 120 until those files and directories have been written out from container file 120.

Figure 2:
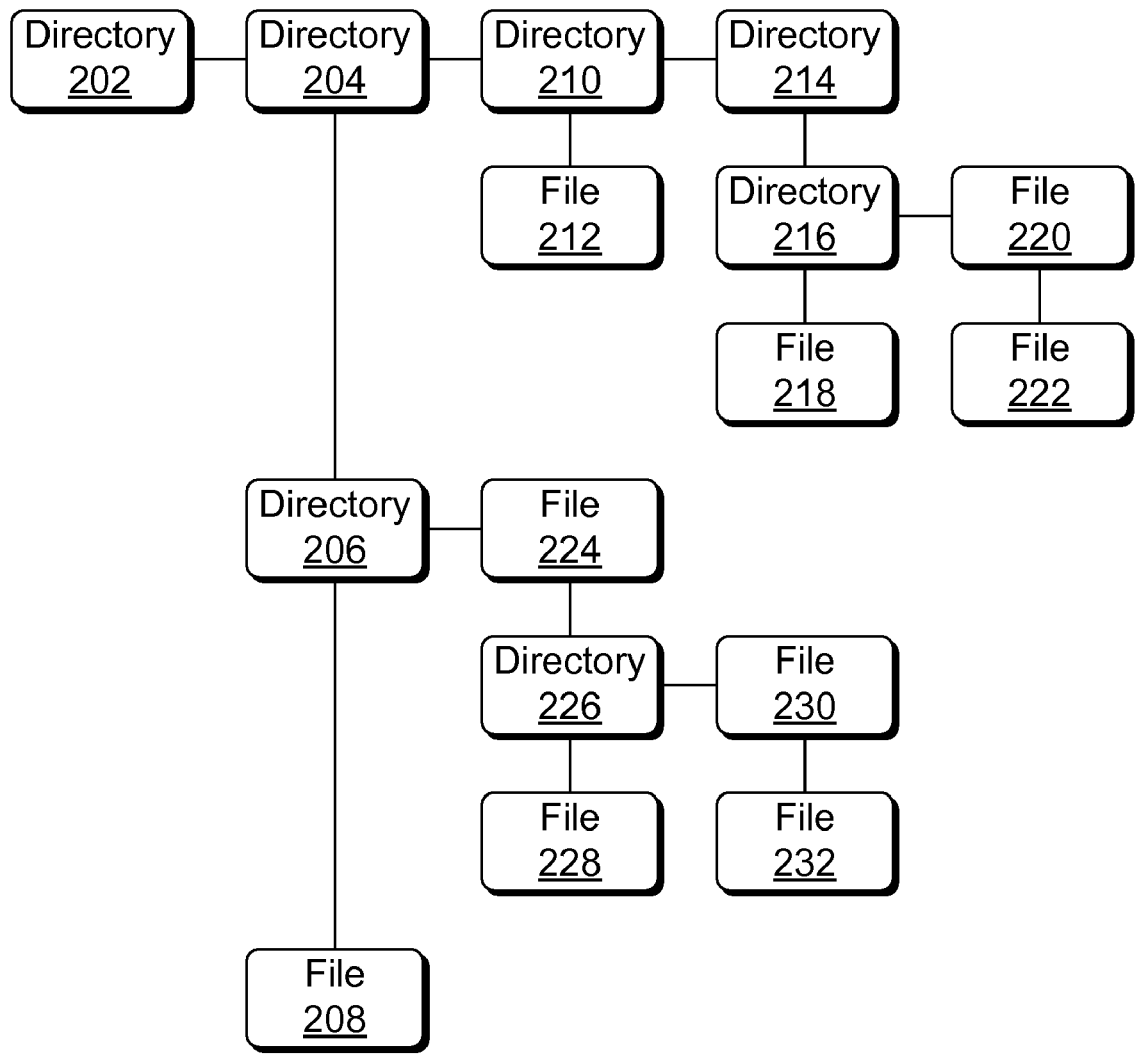
FIG. 2 illustrates files and directories in an example container file in accordance with one or more embodiments.

FIG. 2 illustrates files and directories in an example container file 200 in accordance with one or more embodiments. In the example of FIG. 2, directories or files linked by a vertical line refer to peers within a same directory, while directories or files linked by a horizontal line refer to children of a directory. Container file 200 includes a top-level or root directory 202 that includes two directories 204 and 206 and a file 208. Directory 204 includes a directory 210 and a file 212. Directory 210 in turn includes two directories 214 and 216 and a file 218. Directory 216 includes two files 220 and 222. Additionally, directory 206 includes two files 224 and 228 and a directory 226. Directory 226 in turn includes two files 230 and 232. Container file 200 can also be viewed as having a top-level that is directory 202, a next lower level that includes directories 204 and 206, a next lower level that includes directories 210 and 226, and a next lower level that includes directories 214 and 216.

The files and directories included in container file 200 are illustrated in FIG. 2 along with the directory structure of those files and directories. Container file 200 is shown including only a few files and a few directories in order to avoid cluttering the drawing. It is to be appreciated, however, that numerous additional directories and/or files can be included in container file 200.

Additionally, container file 200 is shown including a top-level directory 202. All other directories and files are illustrated as being included in top-level directory 202 or in a directory chain that leads up to top-level directory 202. Alternatively, no such top-level directory need be included in container file 200. For example, all of the directories and files illustrated in FIG. 2 except for top-level directory 202 could be included in container file 200.

Returning to FIG. 1, situations can arise where a user desires to make changes to some of the files in container file 120. Such situations can arise, for example, when a vendor desires to make changes to a program being distributed using container file 120, when a user desires to add digital watermarks to one or more images in container file 120, when a user desires to add licenses to one or more audio files in container file 120, and so forth.

Generally during operation, application 102 requests to make modifications to files and/or directories within container file 120. In one or more embodiments, application 102 displays or otherwise presents a user interface to a user of computing device 100 allowing the user to select particular files from container file 120 and input desired modifications or changes to those files. Alternatively, application 102 can be programmed to automatically make modifications or changes to such files.

In order to display the directory structure of the files and directories in container file 120, and also to make a change to a file in container file 120, container modification module 106 writes out a stub directory for one or more files and/or directories in container file 120. This writing out or creating of the stub directory is also referred to as mounting the stub directory on storage device 110. A stub directory for container file 120 includes the directory structure for at least a portion of container file 120, including names or other identifiers of files and/or directories in container file 120, but initially excludes the data in the files. This file data can be included at a later time when a modification is to be made to a file as discussed in more detail below.

The directory structure for the stub directory for container file 120 is written out to storage device 110 on an on-demand basis. When application 102 makes a request to access a particular directory, that particular directory is written out and included in the stub directory on storage device 110. Additionally, when application 102 makes a request to access a particular file, that particular file is written out and included in the stub directory on storage device 110.

Thus, when the stub directory for container file 120 is initially written out to storage device 110, the stub directory includes a top-level directory from container file 120. File system 108 can identify the top-level directory and any files and/or directories in the top-level directory, but cannot yet access the data in the files in the top-level directory and cannot yet access all children and other descendents of directories identified in the top-level directory as they have not yet been written out.

By writing out the stub directory for container file 120 on an on-demand basis, the portion of the directory structure that is of interest to application 102 (or a user of application 102) can be written out to storage device 110. However, no time need be spent writing out the data of the files or portions of the directory structure that are not of interest.

In one or more embodiments, the directories are written out on-demand one level at a time as access to directories is requested. For example, when an access to one directory is requested, that one directory is written out but other directories within that one directory (the children directories of that one directory) are not written out. Alternatively, the directories can be written out on-demand two levels at a time. For example, when an access to one directory is requested, that one directory is written out as well as any other directories that are within that one directory (the children directories of that one directory), but additional directories within the other (children) directories are not written out. In other alternatives, the directories can be written out on-demand three or more levels at a time.

Generally, when application 102 requests access to a particular directory, that particular directory is written out to a temporary directory. The temporary directory is populated with identifiers of the files and/or directories in that particular directory, but not the contents of those files and/or other directories in that particular directory. After the particular directory is written out to the temporary directory, the particular directory in the stub file is atomically swapped with (replaced by) the temporary directory. Accordingly, the temporary directory that includes the identifiers of the files and/or directories in that particular directory replaces that particular directory in the stub file. As part of the atomic swapping, the temporary directory can also be (but need not be) replaced by that particular directory in the stub file.

The atomic swapping of the particular directory in the stub file with the temporary directory allows the particular directory to be replaced by the temporary directory without interruption by any other process or thread executing in computing device 100. By atomically swapping these directories, concurrency issues can be avoided because no other thread or process can access the directories during the atomic swapping. In one or more embodiments the directories are atomically swapped by using a single transaction or operation, although other techniques can alternatively be used to atomically swap the directories.

Figure 3:
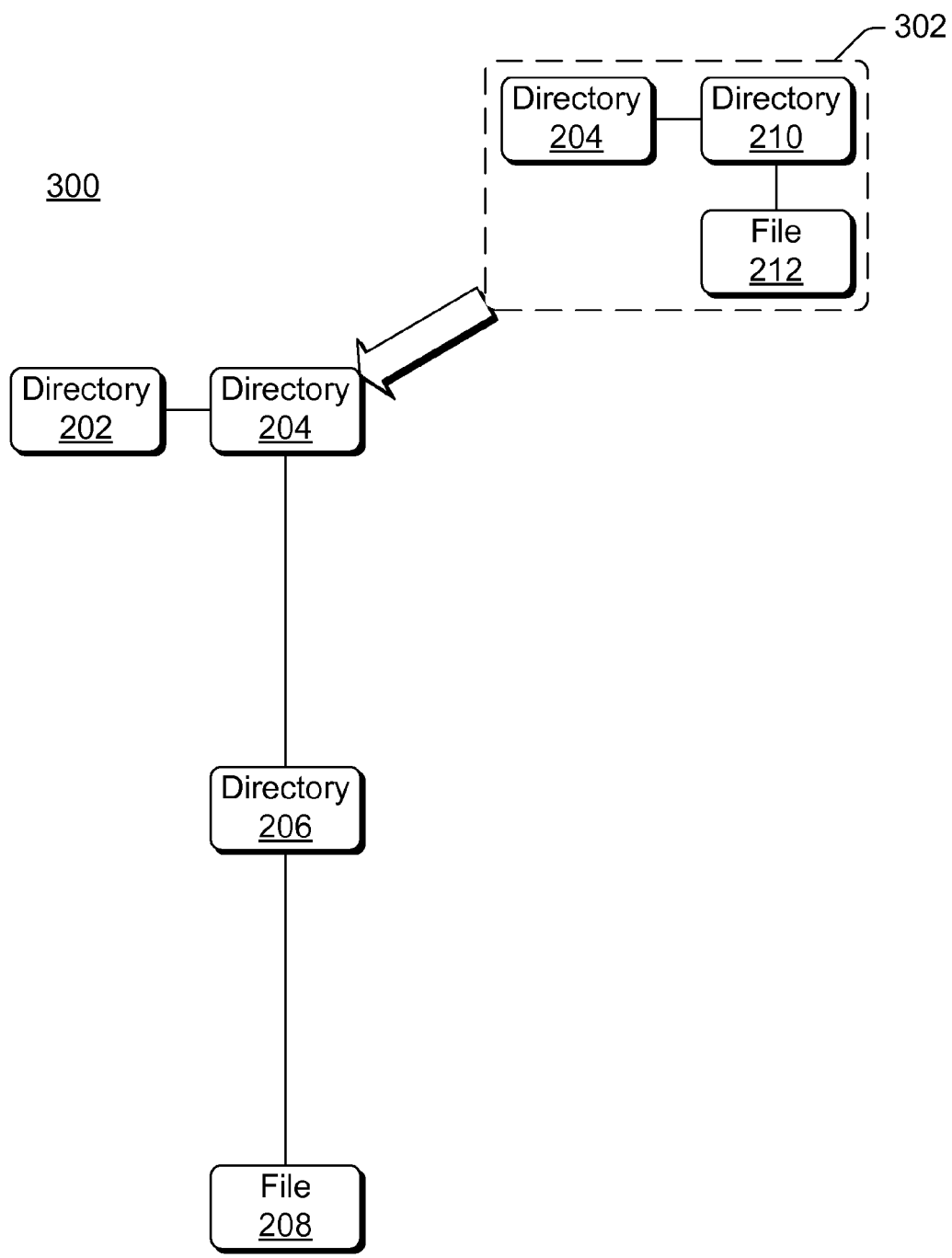
FIGS. 3, 4, and 5 illustrate examples of writing out directories on-demand from a container file in accordance with one or more embodiments.
Figure 4:
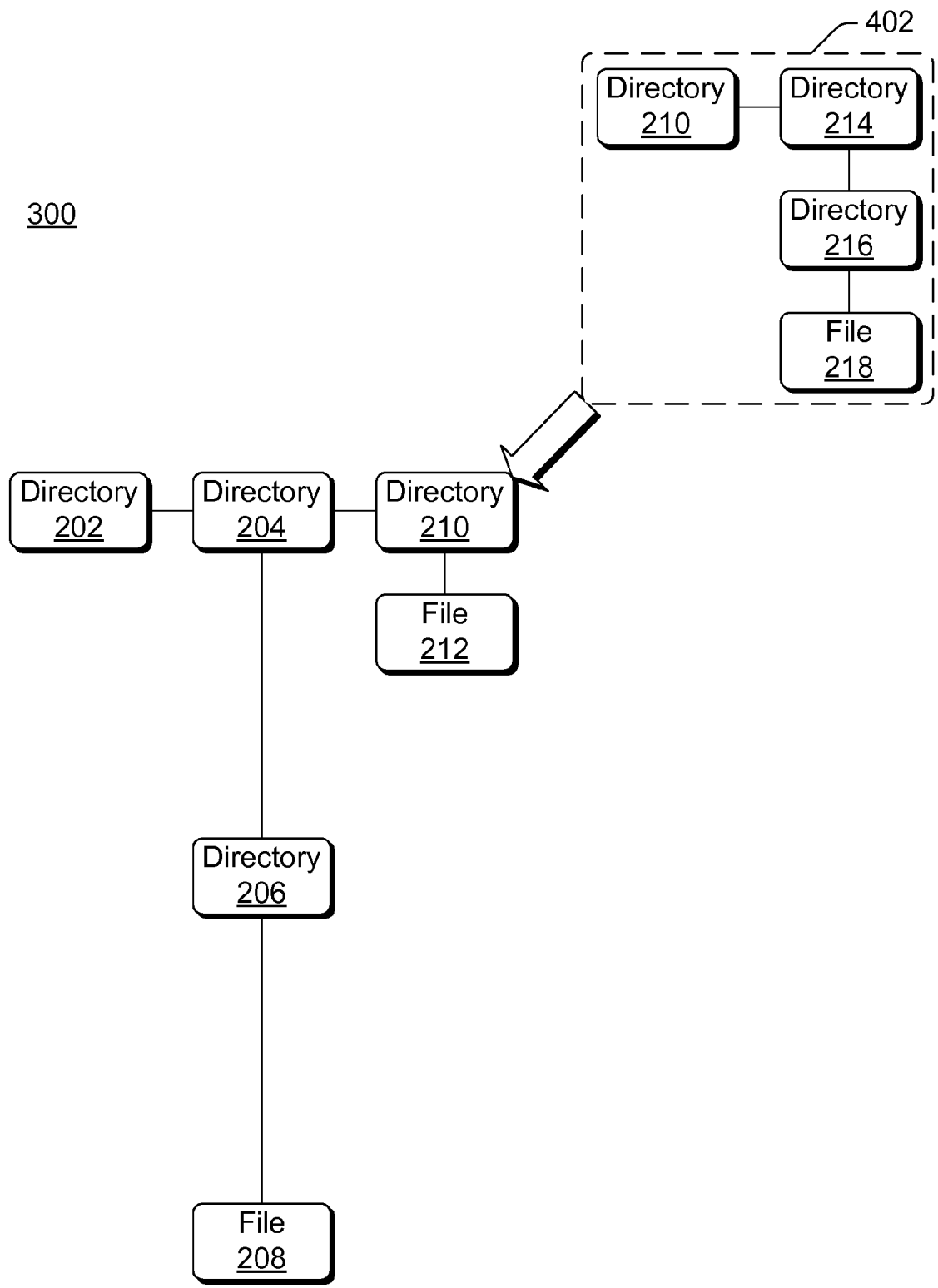
Figure 5:
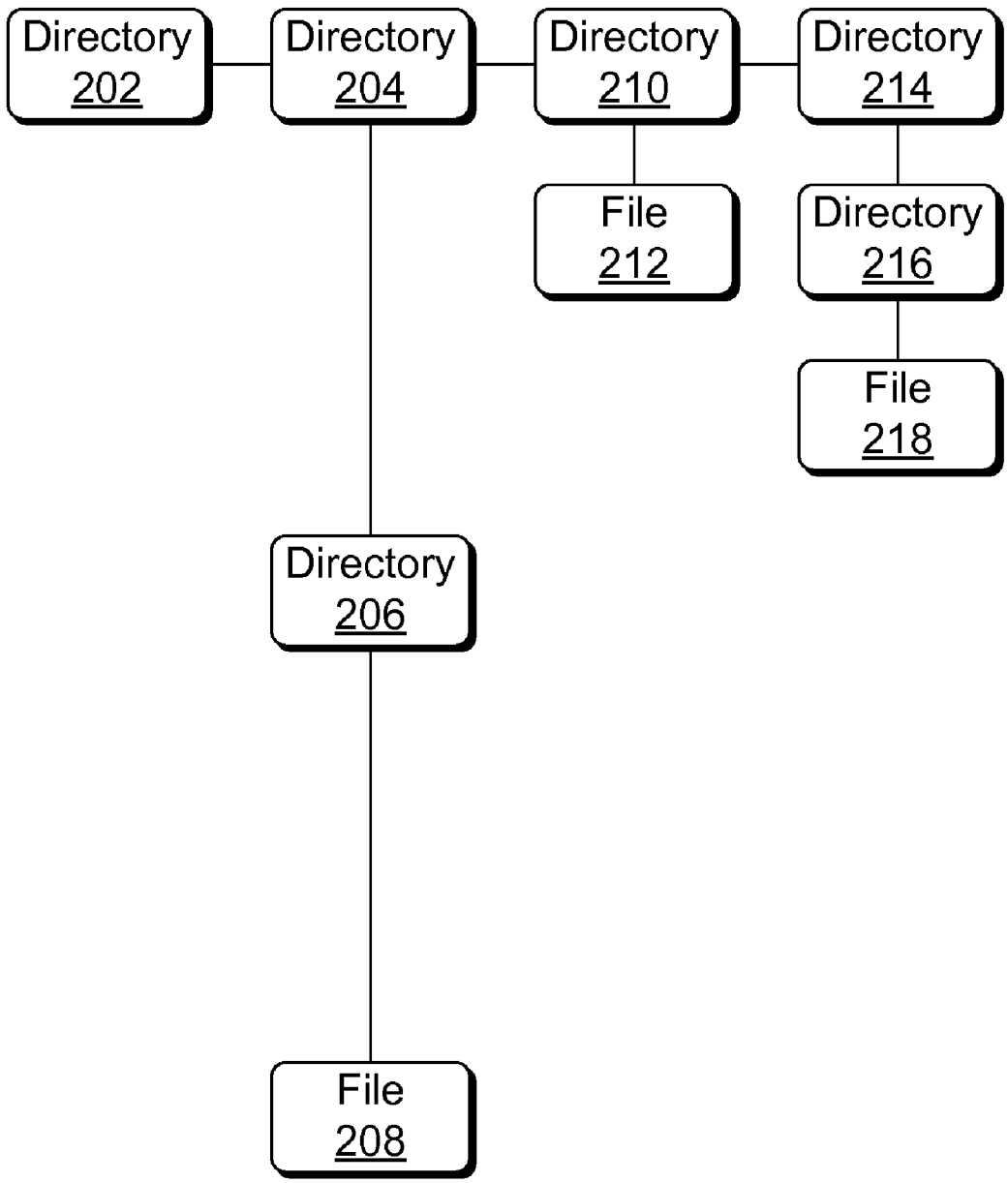

FIGS. 3, 4, and 5 illustrate examples of writing out directories on-demand from container file 120 in accordance with one or more embodiments. A stub directory 300 based on container file 200 is used as an example in FIGS. 3, 4, and 5. In the example of FIGS. 3, 4, and 5, directories are written out on-demand one level at a time. Alternatively, directories can be written out multiple levels at a time as discussed above.

When the stub directory is initially written out, top-level directory 202 is written out, and identifiers of directories 204 and 206, as well as of file 208, are populated in directory 202. The contents of directories 204 and 206 are not yet written out, nor is the data of file 208.

Assuming that application 102 of FIG. 1 requests to access directory 204, directory 204 is next written out. A temporary directory 302 is created and the contents of directory 204 are written out into temporary directory 302. This writing out of the contents of directory 204 is one level deep, so directory 204 is populated with identifiers of directory 210 and file 212, but not the contents of directory 210 or the data of file 212. After temporary directory 302 has been populated with the identifiers of directory 210 and file 212, temporary directory 302 is atomically swapped with directory 204 in stub directory 300, thereby replacing directory 204 in stub directory 300.

FIG. 4 illustrates stub directory 300 after temporary directory 302 of FIG. 3 is atomically swapped with directory 204. After the atomic swap, stub directory 300 includes directory 204 written out. Directory 204 in stub directory 300 is populated with identifiers of directory 210 and file 212, but not the contents of directory 210 or the data of file 212. It should be noted that in this example it is assumed that a request to access directory 206 has not been received, so directory 206 has not been written out.

Following this example, assume that application 102 of FIG. 1 next requests to access directory 210, so directory 210 is written out next. A temporary directory 402 is created and the contents of directory 210 are written out into temporary directory 402. This writing out of the contents of directory 210 is one level deep, so directory 210 is populated with identifiers of directories 214 and 216, and file 218, but not the contents of directories 214 and 216 or the data of file 218. After temporary directory 402 has been populated with the identifiers of directories 214 and 216, and file 218, temporary directory 402 is atomically swapped with directory 210 in stub directory 300, thereby replacing directory 210. FIG. 5 illustrates stub directory 300 after temporary directory 402 of FIG. 4 is atomically swapped with directory 210. After the atomic swap, stub directory 300 includes directory 210 written out. Directory 210 in stub directory 300 is populated with identifiers of directories 214 and 216, and file 218, but not the contents of directories 214 and 216 or the data of file 218

Returning again to FIG. 1, it is to be appreciated that multiple different container files 120 can be accessed by computing device 100. Application 102 identifies, to container modification module 106, a particular container file 120 for which files are to be modified. Container modification module 106 accesses container file 120 and identifies the files, directories, and directory structure from container file 120. Container modification module 106 communicates this accessed information to file system 108 in order for file system 108 to write out the stub directory for container file 120.

Each directory and each file in the stub directory has an associated access control tag. The access control tag associated with a particular directory or file indicates that that particular directory or file is flagged for particular treatment. The access control tag also identifies a particular location of the associated directory or file in container file 120. This identifier of the particular location is maintained even if the file is moved, allowing the location of the associated directory or file in container file 120 to be known despite any such movement.

In the on-demand access to container file directories discussed herein, the access control tag is also used to indicate that the associated directory or file has not yet been written out from container file 120. This access control tag can be implemented in a variety of different manners. In one or more embodiments where file system 108 employs the NT file system (NTFS), such as various members of the Windows® operating system family of operating systems available from Microsoft Corporation of Redmond, Wash., this access control tag is referred to as a reparse tag of a reparse point. The reparse tag indicates that the associated directory or file has not been written out from the container file. Additional information regarding the NT file system and reparse points is available from Microsoft Corporation.

For example, referring to FIG. 2, assume that directory 210 has an associated access control tag that is set. The access control tag of directory 210 being set indicates that the data identifying directories 214 and 216, as well as the data identifying files 218, 220 and 222, as being included in directory 210 has not yet been extracted from container file 120 and written out to the storage device.

Referring again to FIG. 1, when application 102 requests access to a file or directory in the stub directory, file system 108 checks whether the access control tag associated with the requested file and/or directory is set. If the associated access control tag is not set (is cleared) for the file and/or directory, then the data for the requested file and/or directory is included in the stub directory. However, if the associated access control tag is set, data for the requested file and/or directory is not included in the stub directory.

Accordingly, when file system 108 receives a request for access to a file for which the associated access control tag is set, file system 108 returns an indication that the access control tag for that file is set. File system filter 104 receives this indication and communicates with container modification module 106 to extract the data for the requested file from container file 120. Container modification module 106 writes out the extracted data for the requested file to storage device 110 by sending a request to file system 108 to write out the data for the file to storage device 110. File system filter 104 then clears the access control tag associated with that file, and resubmits the request for access to the file to file system 108. As the associated access control tag is no longer set, and the data for the requested file has been extracted from container file 120, the requested file can be accessed by application 102 and modifications to the file can be made.

Similarly, when file system 108 receives a request for access to a directory for which the associated access control tag is set, file system 108 returns an indication that the access control tag for that directory is set. This access control tag being set indicates that the data for the directory is not included in the stub directory. File system filter 104 receives this indication and communicates with container modification module 106 to extract the data for the requested directory from container file 120. Container modification module 106 writes out the extracted data for the requested directory to storage device 110 by sending a request to file system 108 to write out the data for the directory to a temporary directory of storage device 110. Once the extracted data for the requested directory is written to the temporary directory, container modification module 106 sends a request to file system 108 to atomically swap the temporary directory for the requested directory in the stub directory. File system filter 104 then clears the access control tag associated with that directory, and resubmits the request for access to the directory to file system 108. As the associated tag is no longer set, and the data for the requested directory has been extracted from container file 120, the requested directory can be accessed by application 102 and the contents of the requested directory displayed to a user of application 102 (or otherwise accessed by application 102).

The use of a temporary directory and replacing the requested directory with the temporary directory prevents incomplete information in the stub directory from being relied on. For example, situations can arise where a directory that has an access control tag set cannot be modified (e.g., the operating system may not allow such modifications). If the access control tag were to be cleared and then the directory were to be populated with data, a request to access the directory may be received and carried out before populating of the directory has been completed. Such a request would receive incomplete information regarding the directory as its populating has not been completed. The use of the temporary directory allows such situations to be avoided because the temporary directory can be fully populated before it is atomically swapped with the requested directory. As such, there would be no requests for access to the requested directory that are received and carried out before the requested directory is populated.

As discussed above, file system filter 104 receives (also referred to as intercepts) the indication from file system 108 that an access control tag associated with a particular file or directory has been set. File system filter 104 can receive this indication in different manners. In one or more embodiments, upon detecting an access control tag being set, file system 108 finds the particular file system filter (filter 104 in this case) associated with that access control tag and sends the indication to that file system filter. Alternatively, different techniques can be used for file system filter 104 to receive this indication. For example, file system filter 104 can register with file system 108 or another component of an operating system running on computing device 100 to receive any notifications or indications sent by file system 108. By way of another example, all communications between application 102 and file system 108 could pass through file system filter 104, so any indications returned by file system 108 could be intercepted by file system filter 104.

Each file to be modified is thus extracted from container file 120 in response to a request to access that file. After the file has been modified, container modification module 106 replaces the version of the file in container file 120 with the modified version of the file. In one or more embodiments, this replacement occurs after all the files in container file 120 to be modified have been modified. Alternatively, this replacement can occur at other intervals, such as on an individual file by file basis as modifications to the files are completed. Completing modification of a file or set of files can be determined in different manners, such as based on input by a user of application 102 (e.g., user selection of an "quit" or "finish" option) or automatically by application 102 or module 106 (e.g., after a threshold amount of time has elapsed, when application 102 is closed, when a new container file 120 is selected by application 102, and so forth).

In one or more embodiments, container modification module 106 can similarly modify directories in container file 120. This modification can include renaming directories, adding or removing directories, adding or removing files from directories and so forth. A directory extracted from container file 120 for modification is modified, and then replaced by the modified directory. This replacement can occur at different times or intervals, analogous to the discussion above regarding replacement of files with modified versions of the files.

Modern operating systems (e.g., many of those in Windows® operating system family of operating systems) typically include multiple privilege levels, often referred to as user and kernel modes of operation. Kernel-mode is usually associated with and reserved for portions of the operating system. Kernel-mode components run in a reserved address space, which is protected from user-mode components. User-mode components have their own respective address spaces, and can make calls to kernel-mode components using special procedures that employ transitions from one privilege level to another. In one or more embodiments, application 102, file system filter 104, and module 106 are user-mode components, while file system 108 is a kernel-mode process. Having file system filter 104 and module 106 as user-mode components allows the on-demand access to container file directories discussed herein to be largely implemented in a user-mode component that interacts with file system 108 rather than requiring significant modification to file system 108. However, it is to be appreciated that one or more of application 102, file system filter 104, and module 106 can alternatively be employed as kernel-mode components.

Figure 6A:
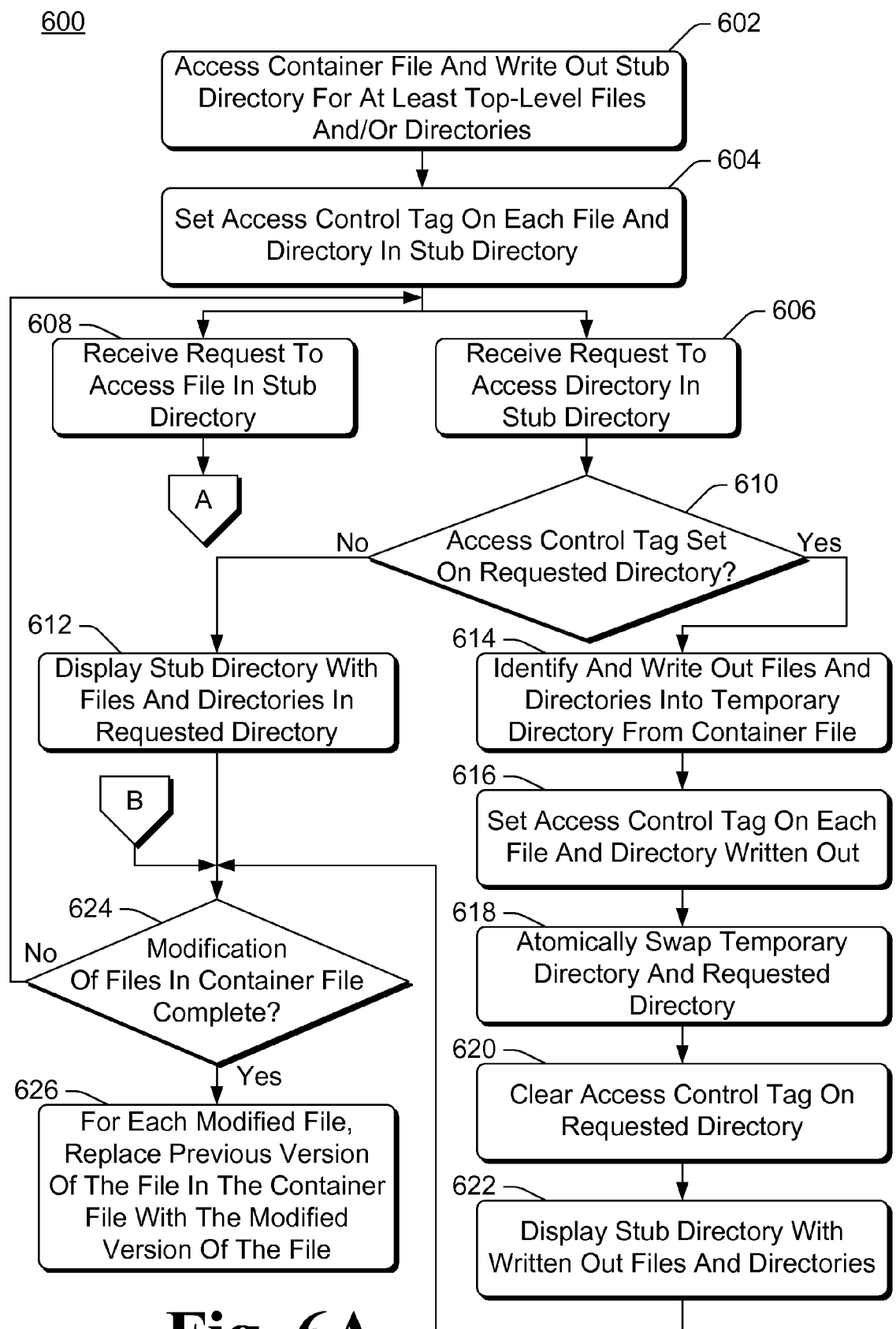
FIGS. 6A and 6B are a flowchart illustrating an example process for on-demand access to container file directories in accordance with one or more embodiments.
Figure 6B:
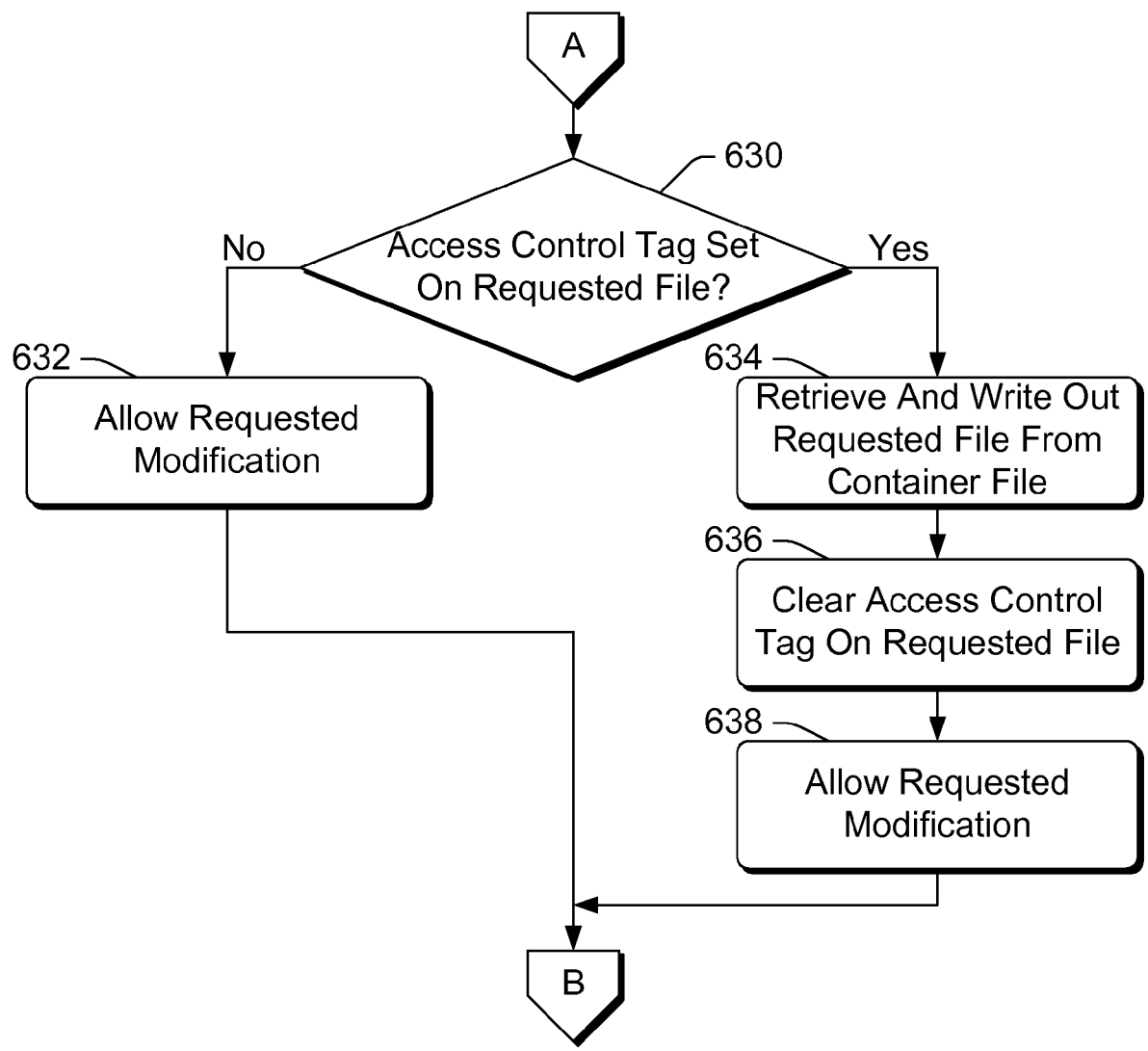

FIGS. 6A and 6B are a flowchart illustrating an example process 600 for on-demand access to container file directories in accordance with one or more embodiments. Process 600 is carried out by a device, such as computing device 100 of FIG. 1, and can be implemented in software, firmware, hardware, or combinations thereof. Process 600 is an example process for on-demand access to container file directories; additional discussions of on-demand access to container file directories are included herein with reference to different figures.

Initially, a container file is accessed and a stub directory is written out for top-level files and/or directories in the container file (act 602). These top-level files and directories are the files and/or directories in the top-level or root directory. As discussed above, the stub directory excludes the data of the files identified in the stub directory, and is written out on-demand. Thus, the entire stub directory for all the files and directories in the container file is typically not written out in act 602. Rather, only the top-level files and/or directories are initially written out, such as directory 202 in the example of FIG. 2. Alternatively, this writing out may go one or more levels deeper than the top-level, such as to include directories 204 and 206 as well as file 208 in the example of FIG. 2.

An access control tag is set on each file and directory in the stub directory that was written out in act 602 (act 604). A request to access a directory in the stub directory can be received (act 606), or a request to access a file in the stub directory can be received (act 608). When a request to access a directory in the stub directory is received (act 606), a check is made as to whether the access control tag associated with the requested directory is set (act 610). If the access control tag is not set, then the stub directory is displayed including the files and directories in the requested directory (act 612). The access control tag not being set indicates that the data for the requested directory has already been extracted from the container file, so this data is available for display in act 612. A check is then made as to whether modification of files in the container file is complete (act 624), as discussed in more detail below.

However, if the access control tag is set, then the files and directories in the requested directory are identified and written out from the container file into a temporary directory (act 614). The access control tag associated with each file and directory written out in act 614 is set (act 616). The temporary directory is then atomically swapped with (and thus replaces) the requested directory in the stub directory (act 618). After the atomic swapping has been completed, the access control tag on the requested directory is cleared (act 620). This clearing of the access control tag can be inherent in the atomic swapping, as the temporary directory need not have its access control tag set. The stub directory is displayed including the files and directories written out in act 614 (act 622).

A check is then made as to whether modification of files in the container file is complete (act 624). If modification of files in the container file is not complete, then process 600 returns to receive another request in act 606 or 608. However, if modification of files in the container file is complete, then for each modified file, the previous version of that file in the container file is replaced with a modified version of the file (act 626), as discussed in more detail below.

Returning to act 608, when a request to access a file in the stub directory is received (act 608), a check is made as to whether the access control tag associated with requested file is set (act 630 of FIG. 6B). If the access control tag is not set, then any requested modifications are allowed on the file (act 632). These requested modifications are received from, for example, application 102 of FIG. 1.

However, if the access control tag is set, then the requested file is retrieved from the container file and written out to the storage device (act 634). The access control tag on the requested file is cleared (act 636), and any requested modifications are performed on the file (act 638). These requested modifications are received from, for example, application 102 of FIG. 1.

After modification is performed to the requested file in act 632 or act 638, process 600 returns to act 622 of FIG. 6A to check whether modification of files in the container file is complete. If modification of files in the container file is not complete, then process 600 returns to receive another request in act 606 or 608.

However, if modification of files in the container file is complete, then for each modified file, the previous version of that file in the container file is replaced with a modified version of the file (act 626). These modified versions of the file are those created when the requested modifications are performed in acts 632 and/or 638. The modified files can be identified in different manners. In one or more embodiments, each file having an associated access control tag that has been cleared is identified as having been modified (regardless of whether any modification was actually made to the file). Alternatively, the modified files can be identified in other matters such as by comparing the contents of the file written out to the contents of the file in the container file, by comparing a timestamp of when the file was written out to a timestamp of when the file was last written to and/or accessed (e.g., if the two timestamps are not the same and the file is identified as having been modified), and so forth. Similarly, in act 626 if any directories are modified then the previous version of that directory in the container file is replaced with the modified version of the directory. These modified directories can be identified in a variety of different manners, analogous to the identification of the modified files discussed above.

Process 600 can also proceed to act 622 without any modification having been performed on the requested file. For example, process 600 can proceed if an indication is received that no modification will be made at this time, if a request to access another file or directory is received, and so forth.

Thus, as can be seen from process 600 of FIGS. 6A, and 6B, a stub directory is initially written out for a top-level of a container file. As requests to access files and/or directories are received, the data for those files and/or directories are extracted from the container file. This extraction continues on a file by file basis, and optionally on a directory by directory basis, until modification of the files from the container file is complete.

Figure 7:
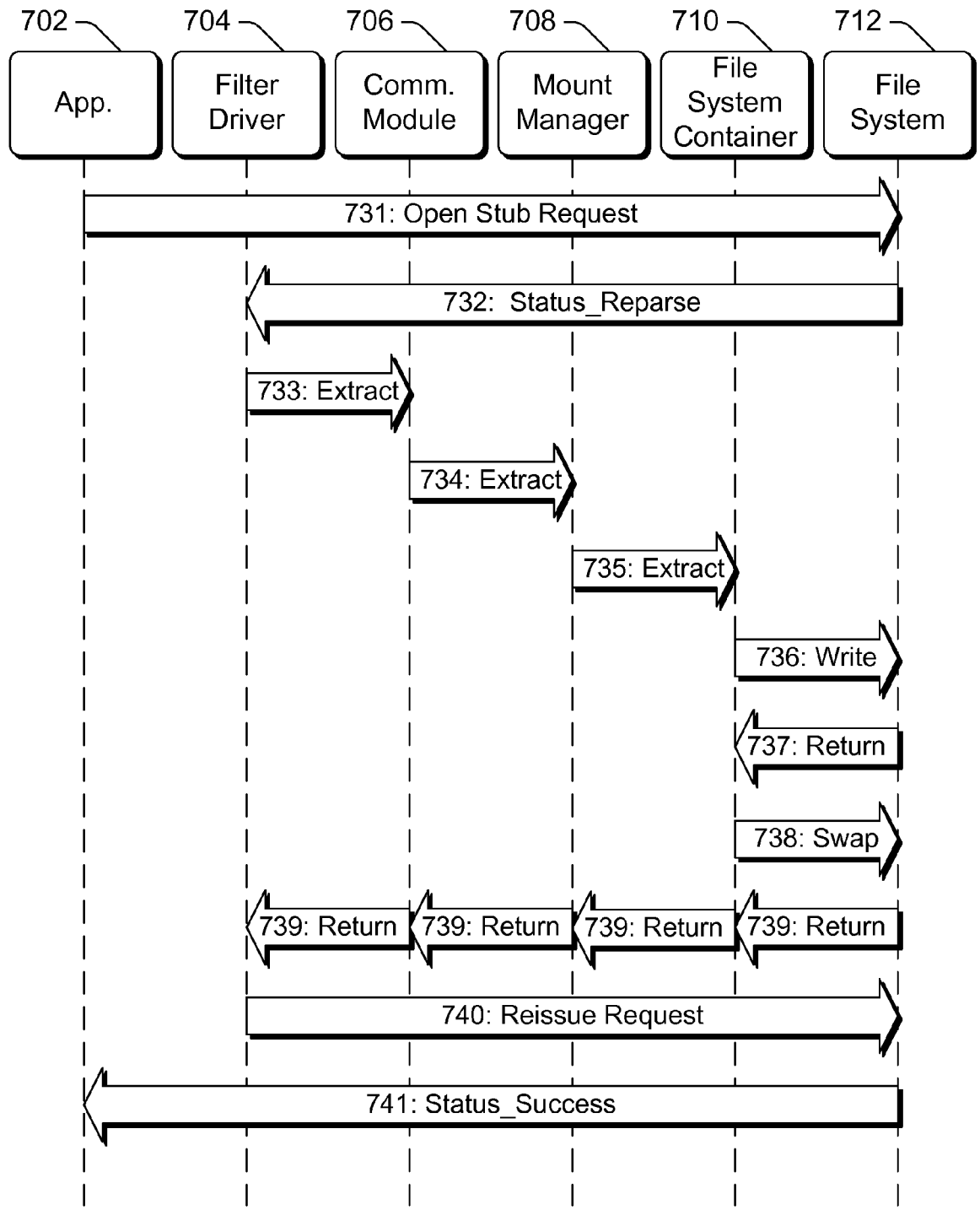
FIG. 7 illustrates an example data flow for accessing a directory or file using the on-demand access to container file directories in accordance with one or more embodiments.

FIG. 7 illustrates an example data flow for accessing a directory or file using the on-demand access to container file directories in accordance with one or more embodiments. In FIG. 7, a system 700 includes an application 702, filter driver 704, communications module 706, mount manager 708, file system container 710, and a file system 712. In one or more embodiments, application 702 is an application 102 of FIG. 1, filter driver 704 is a file system filter 104 of FIG. 1, and file system 712 is a file system 108 of FIG. 1. Additionally, in one or more embodiments communications module 706, mount manager 708, and file system container 710 are tools included as part of container modification module 106 of FIG. 1.

In FIG. 7, file system 712 is discussed as employing reparse points. File system 712 can be, for example, an NT file system. Although discussed with reference to reparse points, it is to be appreciated that system 700 can alternatively use other access control tags as discussed above.

The discussion of system 700 assumes that the top-level of the stub file directory has already been written out to the storage device, and further assumes that reparse points are initially set for each file and directory in the top-level of the stub directory. Initially, a request to open (or otherwise access) a stub file or directory is submitted by an application 702 (act 731). The open request is received by file system 712, which notes that the requested file or directory has a reparse point set. Accordingly, file system 712 fails to open the requested file and returns a status value of "Status_Reparse" (act 732). The Status_Reparse response is intercepted by filter driver 704.

In response to the Status_Reparse response, filter driver 704 issues a request to extract the requested file or directory to communications module 706 (act 733). Filter driver 704 optionally checks whether the requested file or directory is present in the container file prior to issuing this request to communications module 706. If the requested file or directory is present in the container file then filter driver 704 issues this request to communications module 706; otherwise, filter driver 704 returns a failure indication to application 702.

Communications module 706 receives the request to extract the file or directory from filter driver 704 and forwards the request to mount manager 708 (act 734). Mount manager 708 optionally verifies that the requested file or directory is present in the stub directory. This verification can be performed in different manners, such as checking an identifier (e.g., a globally unique identifier (GUID)) of the requested file or directory to the identifiers of the files or directories in the stub directory. If no matching (e.g., equal) identifier in the stub directory is found, then mount manager 708 returns a failure indication to communication module 706, which is in turn passed to filter driver 704 and application 702.

However, if a matching (e.g., equal) identifier in the stub directory is found, then mount manager 708 issues an extract request to file system container 710 (act 735). If the request is a request to access a directory, then file system container 710 retrieves the requested directory from the container file and writes out the directory data (identifiers of files and other directories in the requested directory) to a temporary directory by sending a request to write the identifiers of the files and/or directories of the requested directory to a temporary directory of the storage device to file system 712 (act 736). Once the directory information is written to the temporary directory of the storage device, file system 712 returns an indication that the directory data was successfully written out to the storage device (act 737). In response, file system container 710 atomically swaps the temporary directory with the requested directory in the stub directory by sending a request to atomically swap the two directories to file system 712 (act 738).

Once the atomic swap has been completed, file system 712 returns an indication that the atomic swap has been successfully completed (act 739). This return value is returned from file system 712 to file system container 710, which forwards the return value to mount manager 708, which forwards the return value to communications module 706, which forwards the return value to filter driver 704.

Returning to act 735, if the request is a request to access a file, then file system container 710 retrieves the requested file from the container file and writes out the file data by sending a request to write the file data to the storage device to file system 712 in act 736. File system 712 writes the file data to the storage device, opening the stub file with a flag to bypass the reparse point, such as a File_Flag_Open_Reparse_Point flag. Once the file data is written to the storage device, file system 712 returns an indication that the file data was successfully written out to the storage device in act 739. This return value is returned from file system 712 to file system container 710, which forwards the return value to mount manager 708, which forwards the return value to communications module 706, which forwards the return value to filter driver 704.

Upon receiving this return value that the atomic swap was successfully completed (or that the file data was successfully written out), filter driver 704 knows that the data for the requested file or directory can now be accessed by file system 712. Accordingly, in act 740 filter driver 704 removes the reparse point from the file or directory and reissues the open stub request from act 731. The reissued open request is received by file system 712, which now notes that the requested file or directory no longer has a reparse point set. Accordingly, file system 712 opens the file or directory and returns a handle of the file or directory to application 702 along with an indication that the opening of the file or directory was successful, such as by returning a value of "Status_Success" (act 739). Filter driver 704 allows the indication that the opening (or other accessing) of the file or directory was successful to return to application 702 without intercepting the indication. Application 702 can subsequently make modifications to the file or directory in a conventional manner by interacting with file system 712 and referring to the file or directory using its handle.

Figure 8:
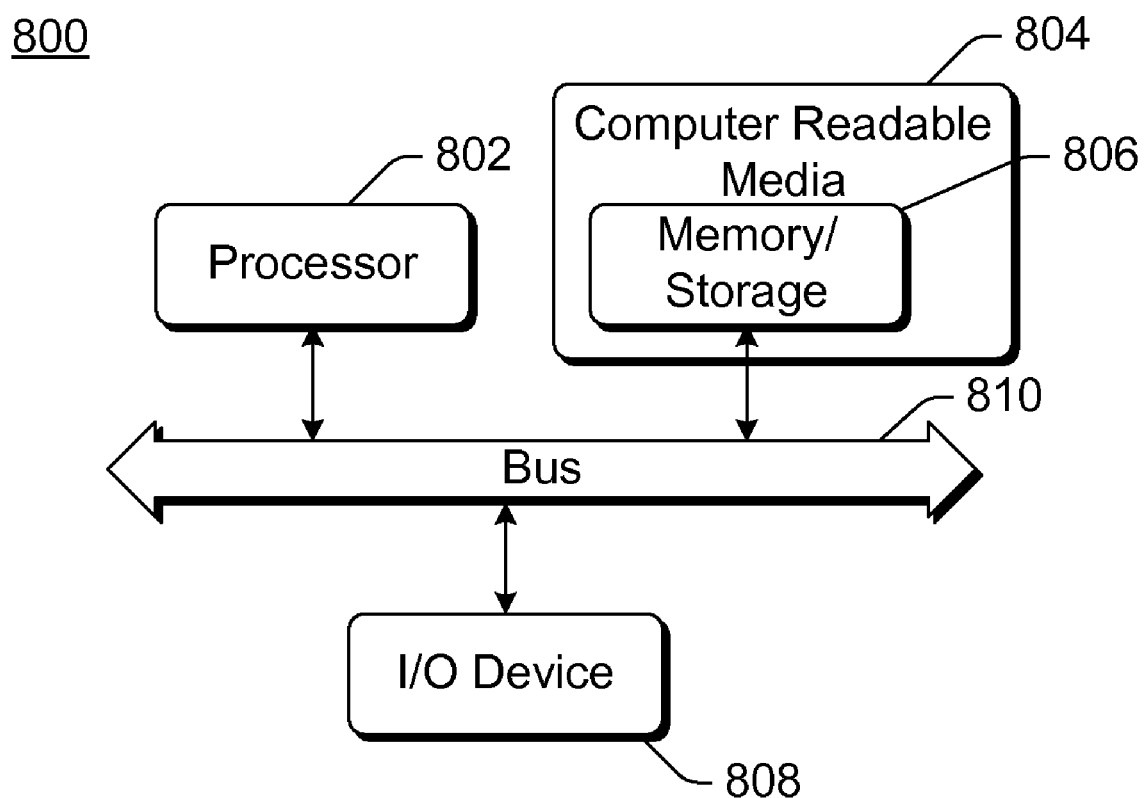
FIG. 8 illustrates an example computing device that can be configured to implement the on-demand access to container file directories in accordance with one or more embodiments.

FIG. 8 illustrates an example computing device 800 that can be configured to implement the on-demand access to container file directories in accordance with one or more embodiments. Computing device 800 can be, for example, computing device 100 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or I/O device(s) 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the on-demand access to container file directories techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    writing out, to a storage device, one or more levels of a stub directory from a container file, the stub directory initially including identifiers of one or more directories in the one or more levels of the stub directory but not identifiers of additional directories in the one or more directories; and
    in response to a request to access one of the one or more directories, writing out from the container file identifiers of at least one or more additional directories and one or more files in the one directory.

2. A method as recited in claim 1, wherein the one or more levels of the stub directory comprises a top-level directory of the stub directory.

3. A method as recited in claim 1, further comprising, in response to a request to access a file in the one directory:
    writing out the data of the file to the storage device;
    allowing a requested modification to be performed on the file to generate a modified version of the file; and
    replacing, after modification of the file is completed, a previous version of the file in the container file with the modified version of the file.

4. A method as recited in claim 1, further comprising:
    allowing a requested modification to be performed on the one directory; and
    replacing, after the modification of the one directory is completed, a previous version of the one directory in the container file with the modified version of the one directory.

5. A method as recited in claim 1, wherein the writing out the identifiers comprises:
    writing out identifiers of each of the one or more additional directories in the one directory to a temporary directory of the storage device; and
    replacing the one directory in the stub directory with the temporary directory.

6. A method as recited in claim 5, wherein the one directory of the stub directory has a first access control tag that is set to indicate that contents of the one directory have not yet been written out to the storage device, and wherein the temporary directory has a second access control tag that is cleared to indicate that contents of the temporary directory have been written out to the storage device.

7. A method as recited in claim 1, further comprising:
    setting an access control tag associated with the one directory; and
    clearing the access control tag associated with the one directory after the identifiers of the one or more additional directories in the one directory are extracted from the container file.

8. A method as recited in claim 7, wherein the access control tag comprises a reparse tag of a reparse point.

9. A method as recited in claim 1, further comprising:
receiving, after the identifiers of the at least one or more additional directories and one or more files in the one directory are extracted from the container file, a subsequent request to access the one directory; and
allowing the subsequently requested access to the one directory without again writing out the identifiers of the at least one or more additional directories in the one directory from the container file.

10. A method as recited in claim 1, further comprising:
in response to a request to access a particular additional directory in the one directory, writing out from the container file identifiers of at least one directory and one file in the particular additional directory.

11. A method as recited in claim 1, further comprising, wherein writing out the identifiers comprises writing out the identifiers only if an access control tag associated with the one directory is set.

12. One or more computer storage media having stored thereon multiple instructions that, when executed by one or more processors of a device, cause the one or more processors to:
receive a status value from a file system, the status value indicating that a request to access a directory failed because an access control tag associated with the directory was set;
send a request to a container modification module to have the directory extracted from the container file and written out to a storage device; and
after the directory is extracted from the container file and written out to the storage device, clear the access control tag associated with the directory and reissue the request to the file system.

13. One or more computer storage media as recited in claim 12, wherein the access control tag comprises a reparse tag of a reparse point.

14. One or more computer storage media as recited in claim 12, wherein the request to have the directory extracted from the container file and written out to the storage device includes a request to have one or more additional levels of directories extracted from the container file and written out to the storage device.

15. One or more computer storage media as recited in claim 12, the multiple instructions further causing the one or more processors to allow an indication that accessing the directory was successful to be returned to an application issuing the request.

16. One or more computer storage media as recited in claim 12, wherein to have the directory extracted from the container file and to clear the access control tag is to:
write out identifiers of one or more additional directories in the directory to a temporary directory, an access control tag associated with the temporary directory being cleared; and
replace the directory with the temporary directory.

17. One or more computer storage media as recited in claim 12, the multiple instructions further causing the one or more processors to:
receive an additional status value from the file system, the additional status value indicating that an additional request to access an additional directory in the directory failed because an access control tag associated with the additional directory was set;
send an additional request to a container modification module to have the additional directory extracted from the container file and written out to the storage device; and
after the additional directory is extracted from the container file and written out to the storage device, reissue the additional request to the file system.

18. One or more computer storage media as recited in claim 12, the multiple instructions further causing the one or more processors to:
receive an additional status value from the file system, the additional status value indicating that a request to access a file failed because an access control tag associated with the file was set;
send an additional request to the container modification module to have the file extracted from the container file and written out to the storage device; and
after the file is extracted from the container file and written out to the storage device, clear the access control tag associated with the file and reissue the additional request to the file system.

19. One or more computer storage media having stored thereon multiple instructions that, when executed by one or more processors of a device, cause the one or more processors to:
write out, to a storage device of the device, a top-level directory of a stub directory from a container file, the stub directory initially including identifiers of one or more directories in the top-level of the stub directory but not identifiers of additional directories or additional files in the one or more directories;
in response to a request to access one of the one or more directories,
write out each of additional directories in the one directory to a temporary directory of the storage device,
write out each of the additional files in the one directory to the temporary directory, and
replace the one directory with the temporary directory; and
in response to a request to modify one of the one or more files in the one directory,
write out the data of the file to the storage device,
allow a requested modification to be performed on the file to generate a modified version of the file, and
replace, after modification of the file is completed, a previous version of the file in the container file with the modified version of the file.

20. One or more computer storage media as recited in claim 19, the one directory having an access control tag that is initially set to indicate that contents of the one directory have not yet been written out to the storage device, the access control tag being cleared after the contents of the one directory have been written out to the storage device.

* * * * *